US011394272B2

(12) United States Patent
Jipp

(10) Patent No.: US 11,394,272 B2
(45) Date of Patent: Jul. 19, 2022

(54) ELECTRIC MOTOR INSULATOR

(71) Applicant: MILWAUKEE ELECTRIC TOOL CORPORATION, Brookfield, WI (US)

(72) Inventor: Ryan B. Jipp, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/484,122

(22) Filed: Sep. 24, 2021

(65) Prior Publication Data

US 2022/0103044 A1 Mar. 31, 2022

Related U.S. Application Data

(60) Provisional application No. 63/084,082, filed on Sep. 28, 2020.

(51) Int. Cl.
*H02K 7/14* (2006.01)
*H02K 3/34* (2006.01)
*H02K 3/28* (2006.01)
*H02K 3/12* (2006.01)
*H02K 9/22* (2006.01)

(52) U.S. Cl.
CPC .............. *H02K 7/145* (2013.01); *H02K 3/12* (2013.01); *H02K 3/28* (2013.01); *H02K 3/345* (2013.01); *H02K 9/22* (2013.01)

(58) Field of Classification Search
CPC .. H02K 3/04; H02K 3/12; H02K 3/34; H02K 9/22; H02K 15/04; H02K 15/0414; H02K 15/08
USPC .............................................. 310/64, 65, 215
See application file for complete search history.

(56) References Cited

U.S. PATENT DOCUMENTS

| 2014/0015352 A1 | 1/2014 | Marvin et al. |
| 2020/0076262 A1* | 3/2020 | Klonowski .............. H02K 3/28 |
| 2020/0169142 A1 | 5/2020 | Crosby et al. |

FOREIGN PATENT DOCUMENTS

| JP | 2007244065 A | 9/2007 |
| JP | 2013005481 A | 1/2013 |
| KR | 101883857 B1 | 8/2018 |
| WO | 2016120969 A1 | 8/2016 |

OTHER PUBLICATIONS

International Search Report and Written Opinion for Application No. PCT/US2021/051893 dated Jan. 10, 2022 (8 pages).

* cited by examiner

*Primary Examiner* — Quyen P Leung
*Assistant Examiner* — Minki Chang
(74) *Attorney, Agent, or Firm* — Michael Best & Friedrich LLP

(57) ABSTRACT

A stator comprises a main body with a slot defined therein. A winding is positioned within the slot and a wire is positioned within the slot. The wire is positioned between the winding and the main body.

20 Claims, 4 Drawing Sheets

ELECTRIC MOTOR INSULATOR

CROSS-REFERENCE TO RELATED APPLICATIONS

This application claims priority to U.S. Provisional Patent Application No. 63/084,082 filed on Sep. 28, 2020, the entire content of which is incorporated herein by reference.

FIELD OF THE INVENTION

The present invention relates to electric motors, and more particularly to electric motors for power tools.

BACKGROUND OF THE INVENTION

Electric motors typically include a ferromagnetic body and electricity-carrying conductors. The ferromagnetic body may also be electrically conductive and therefore must be electrically insulated from the electricity-carrying conductors. An insulator made from paper or plastic is typically used.

SUMMARY OF THE INVENTION

The present invention provides, in one aspect, a stator including a main body with a slot defined therein, a winding positioned within the slot, and a wire positioned within the slot. The wire is positioned between the winding and the main body.

The present invention provides, in another aspect, an electric motor including a stator and a rotor. At least one of the stator and the rotor includes a main body that defines a slot, a winding positioned within the slot, and a wire positioned within the slot. The wire is positioned between the winding and the main body.

The present invention provides, in another aspect, a power tool including a housing and an electric motor positioned within the housing. The electric motor includes a main body that defines a slot, a winding positioned within the slot, and a wire positioned within the slot. The wire is positioned between the winding and the main body.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
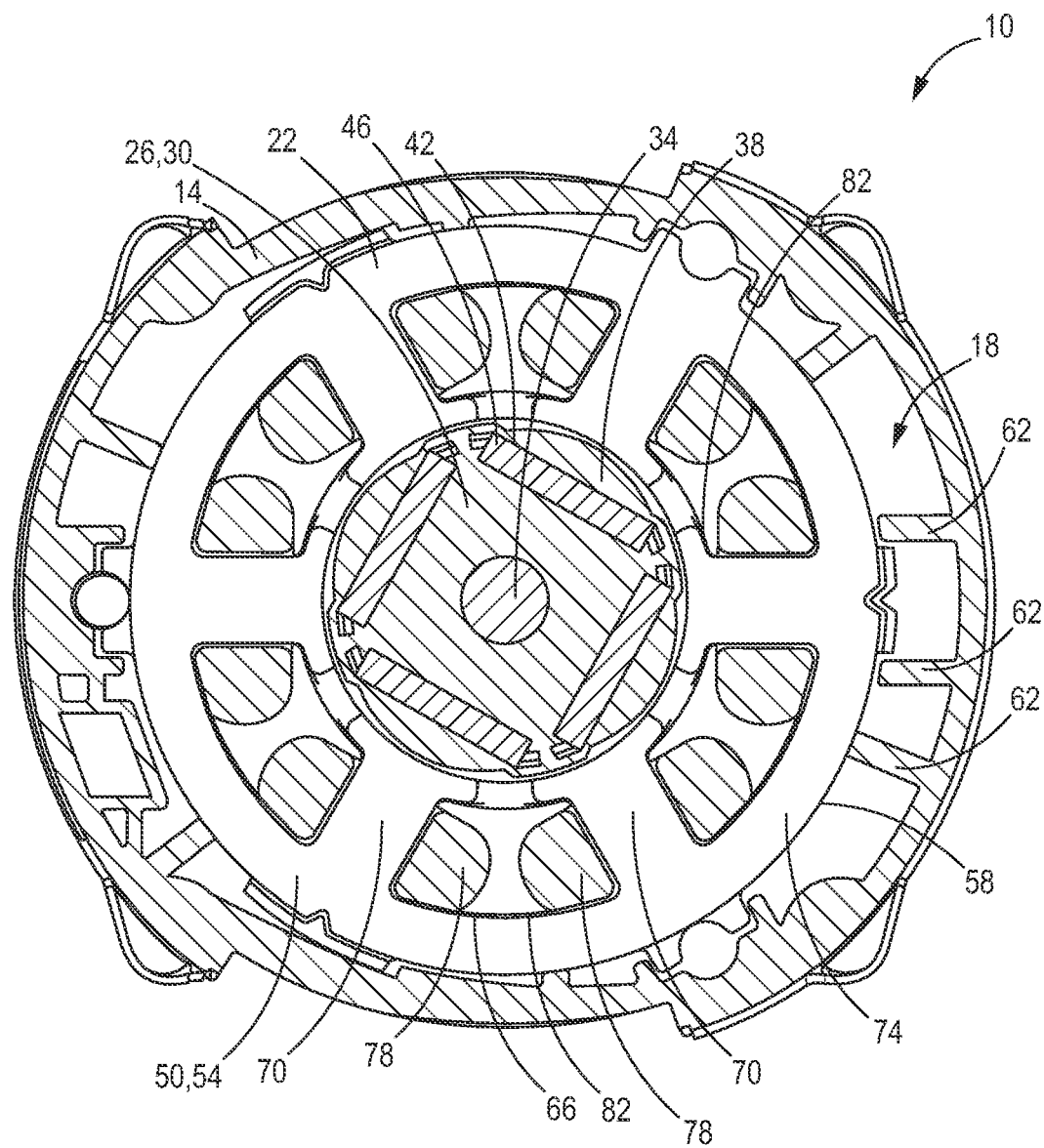
FIG. 1 is a cross-sectional view of a power tool with an electric motor.

With reference to FIG. 1, a power tool 10 includes a housing 14 and an electric motor 18 positioned within the housing 14. In some embodiments, the housing 14 is formed as two mating clamshell housings. The electric motor 18 includes a stator 22 and a rotor 26. In the illustrated embodiment, the rotor 26 is positioned within the stator 22 and is rotatable with respect to the stator 22. In other embodiments, the stator 22 is positioned within the rotor 26 (i.e., an outer-rotor motor design). In other embodiments, the electric motor 18 is a linear motor with the rotor configured to translate along the stator. In some embodiments, the electric motor 18 is a brushless DC motor. In some embodiments, the electric motor 18 is configured as a generator.

With continued reference to FIG. 1, the rotor 26 includes a rotor main body 30 and a shaft 34. In the illustrated embodiment, the rotor main body 30 is formed by a plurality of rotor laminations 38 stacked together to form a lamination stack. In other embodiments, the rotor main body 30 is a unitary piece of material. In the illustrated embodiment, the rotor main body 30 is ferromagnetic and includes magnet slots 42 in which to receive permanent magnets 46. In other embodiments, the rotor main body 30 includes a slot that receives a winding.

The stator 22 includes a stator main body 50. In the illustrated embodiment, the stator main body 50 is formed by a plurality of laminations 54 stacked together to form a lamination stack. In other embodiments, the stator main body 50 may be a unitary piece of material. In the illustrated embodiment, the stator main body 50 is ferromagnetic. An outer circumferential surface 58 of the stator 22 is at least partially supported by a plurality of supports 62 on the housing 14 that extend radially inward.

The stator main body 50 defines a plurality of slots 66 at least partially formed by stator teeth 70 extending radially inward from an outer ring 74 towards the shaft 34. Stator windings 78 are wound around the stator teeth 70 and are at least partially positioned within the slots 66. The stator windings 78 are electrically coupled to a power supply and are selectively energized during operation of the electric motor 18. In some embodiments, the power supply includes a battery pack or a standard AC electrical outlet connected to a power cord. An inverter may be positioned between the power supply and the stator windings 78 and may be utilized to control electrical energization of the stator windings 78. Each stator winding 78 is formed from a magnet wire having an electrically conductive core and an electrically insulative film. The individual coils or turns of the stator windings 78 may be bonded together by an adhesive, an epoxy, a thermal plastic, or other suitable bonding material.

With continued reference to FIG. 1, an insulator 82 is positioned within the slots 66 formed in the stator main body 50. The insulator 82 is positioned between the stator windings 78 and the stator main body 50. The insulator 82 prevents the stator windings 78 from physically contacting the stator main body 50. Contact between the stator windings 78 and the stator main body 50 can create a short circuit and cause electric motor failure. The insulator 82 is an electrical insulator. The insulator 82 illustrated in FIG. 1 is a slot liner made from paper or plastic. Although the insulator 82 is adequate to electrically insulate the stator windings 78, the insulator 82 is also a thermal insulator that traps unwanted heat within the stator windings 78. In other words, the insulator 82 acts as a thermal barrier that prevents the conduction of accumulated heat in the stator windings 78 to the stator main body 50, therefore preventing effective cooling of the stator windings 78.

Figure 2:
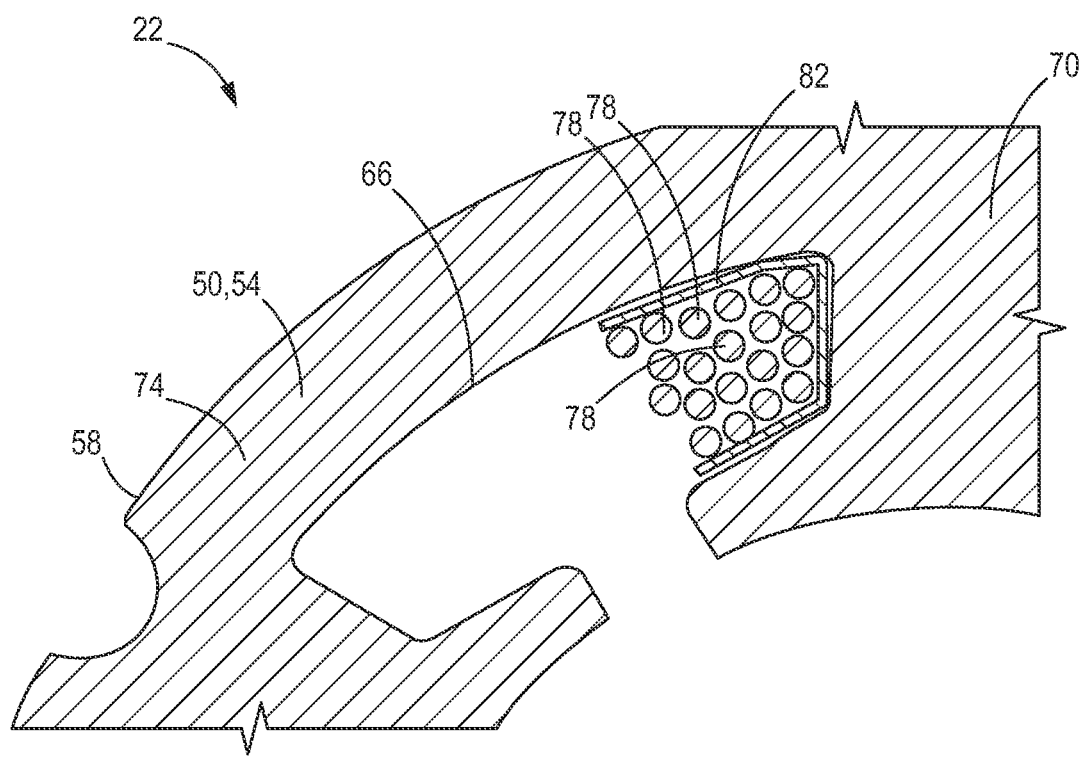
FIG. 2 is a schematic view of a prior art insulator and a winding positioned within a slot of an electric motor.

With reference to FIG. 2, a prior art arrangement is illustrated of the stator winding 78 and the insulator 82 positioned within the slot 66 of the stator main body 50. The stator winding 78 forms a plurality of coils wrapped around the stator tooth 70. The insulator 82 is a unitary piece of electrically insulating material. In the illustrated embodiment, the insulator 82 is positioned along an outermost extent of the slot 66 and is positioned between the winding 78 and the main body 50. As the stator winding 78 is electrically energized, the stator winding 78 generates heat. In addition to electrically insulating the stator windings 78 from the stator main body 50, the insulator 82 acts as a thermal insulator and prevents heat from transferring from the stator winding 78 to the stator main body 50 where the heat can be more effectively dissipated. An excess of heat within the stator winding 78 can result in reduced motor performance or failure.

Figure 3:
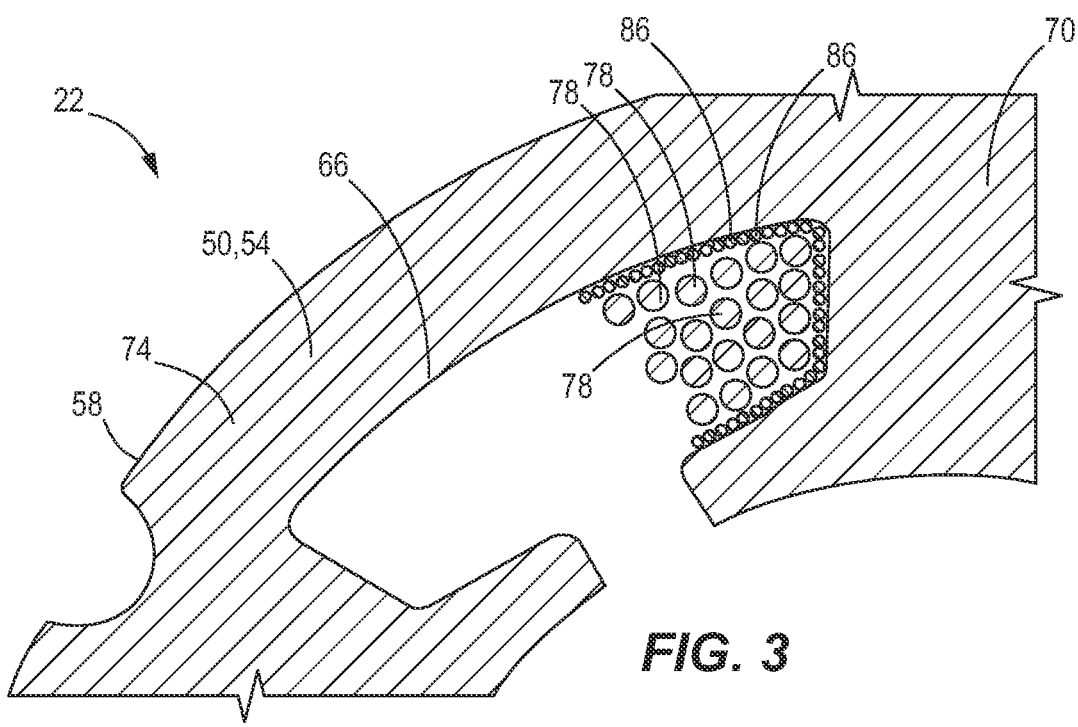
FIG. 3 is a schematic view of a wire and a winding positioned within a slot of an electric motor according to an embodiment of the invention.
Figure 5:
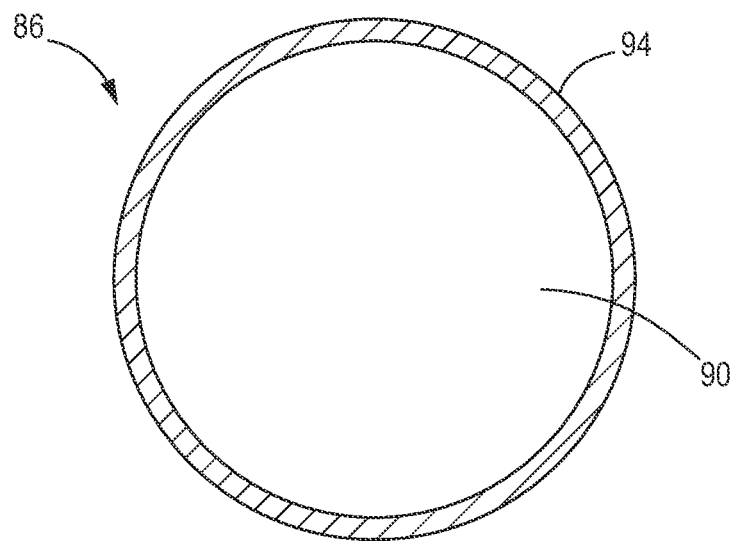
FIG. 5 is a cross-sectional view of the wire of FIG. 3.

With reference to FIG. 3, a wire 86 and the winding 78 are positioned within the slot 66 of the main body 50. The wire 86 is positioned between the winding 78 and the main body 50. In particular, the wire 86 is positioned between the winding 78 and the stator teeth 70, and between the winding 78 and the outer ring 76. In other words, the wire 86 physically separates the winding 78 from the main body 50. The wire 86 is electrically isolated from the winding 78. In other words, the winding 78 is electrically coupled to the power supply, but the wire 86 is not electrically coupled to the power supply. In the illustrated embodiment, the wire 86 is a magnet wire. With reference to FIG. 5, the wire 86 includes an electrically conductive core 90 (e.g., copper) and an electrically insulative film 94. In some embodiments, the insulative film 94 is a polymer. In other embodiments, the insulative film 94 is an enamel. In the illustrated embodiment, the wire 86 is round. In other embodiments, the wire 86 may be rectangular, square, or any suitable shape. No slot liner paper or unitary plastic insulator (like the insulator 82) is used in the arrangement of FIG. 3.

Figure 4:
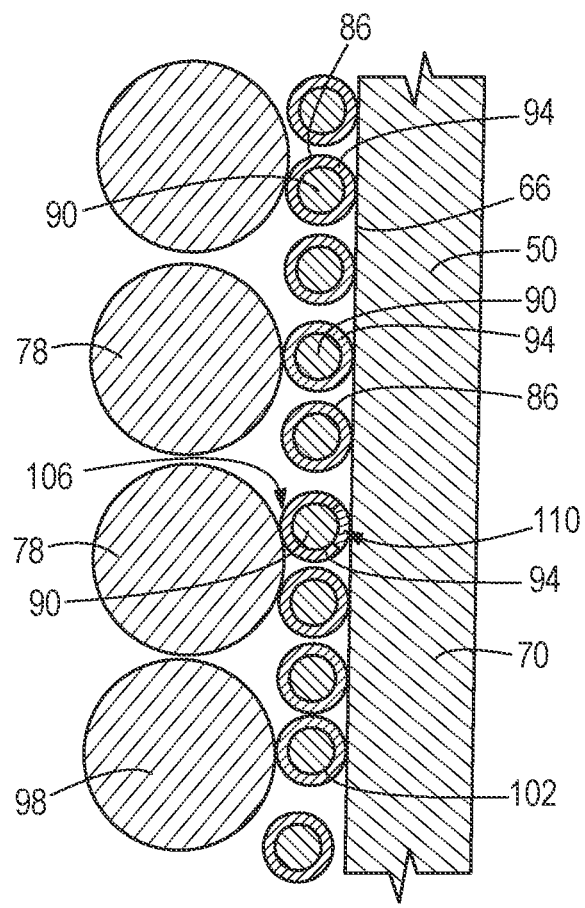
FIG. 4 is an enlarged view of the wire and the winding of FIG. 3.

With reference to FIG. 4, the winding 78 is formed from magnet wire having a first cross-sectional area 98, and the wire 86 is also formed from magnet wire having a second cross-sectional area 102. In the illustrated embodiment, the second cross-sectional area 102 is smaller than the first cross-sectional area 98. In other embodiments, the second cross-sectional area 102 is larger than the first cross-sectional area 98. In other embodiments, the second cross-sectional area 102 is approximately the same as the first cross-sectional area 98 (i.e., the same sized magnet wire is used for the winding 78 and the wire 86). The wire 86 is positioned along the outermost extent of the slot 66. The insulative film 94 of the wire 86 directly contacts the winding 78. The insulative film 94 of the wire 86 includes a first portion 106 contacting the winding 78 and a second portion 110 contacting the main body 50. The first portion 106 is positioned radially opposite the second portion 110. In some embodiments, the second portion 110 of the film 94 is removed. The second portion 110 may be removed, for example, during installation of the wire 86 into the slot 66. The removal of the second portion 110 may occur due to the second portion 110, for example, scratching or rubbing against the main body 50 during installation of the wire 86 within the slot 66. In some embodiments, the electrically conductive core 90 of the wire 86 directly contacts the main body 50. The core 90 of the wire 86 is a good thermal conductor and has a thermal conductivity that is higher than an insulator, such as insulator 82.

The wire 86 may be referred to as a sacrificial winding because the wire 86 does not carry electricity from the power supply. Typically, the amount of current-carrying wire within the slot 66 is maximized in order to increase power density. However, the wire 86 in the illustrated embodiment is wound around each stator tooth 70 as a sacrificial first and separate winding of motor magnet wire that is positioned directly against the laminations 54 of the main body 50. The main stator winding 78 is then wound over the top of the wire 86. The wire 86 is utilized as an electrical insulator (i.e., a material with a large electrical resistance) and a thermal conductor instead of being used to carry electricity from the power supply. The wire 86 conducts heat away from the winding 86, which results in better performance from the electric motor 18, while simultaneously electrically insulating the winding 86 from the main body 50.

Figure 6:
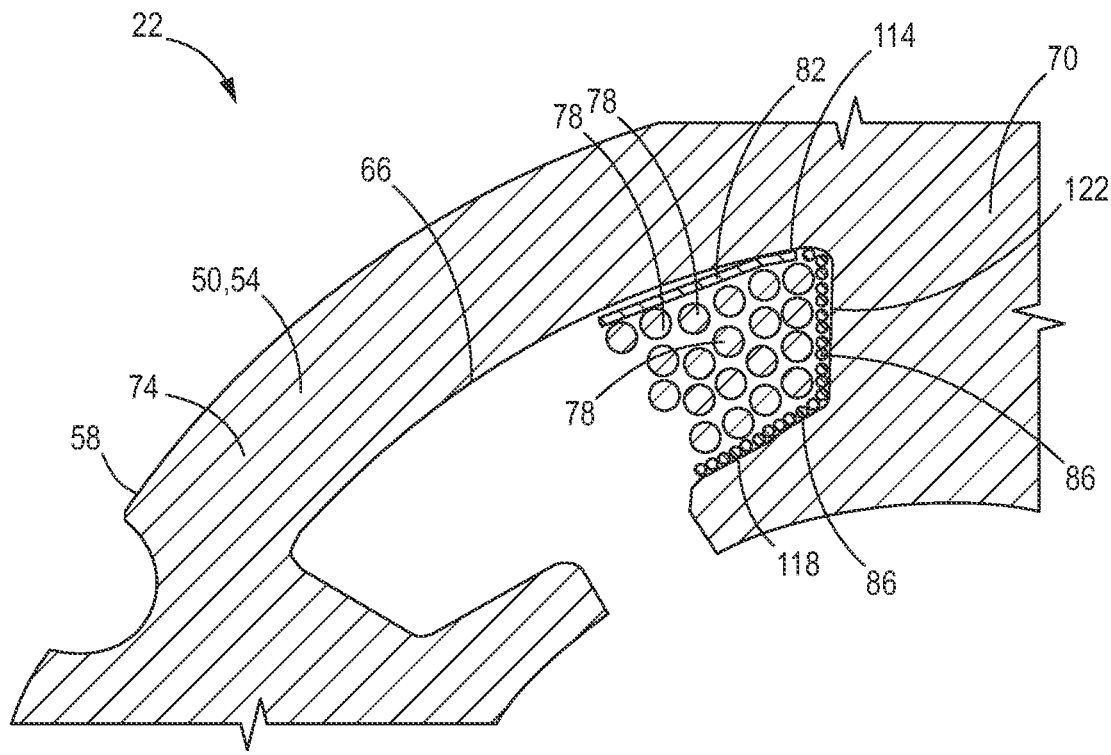
FIG. 6 is a schematic view of a wire, a winding, and an insulator positioned within a slot of an electric motor according to another embodiment of the invention.

With reference to FIG. 6, a combination of the insulator 82 (e.g., a portion thereof) and the wire 86 is used to electrically isolate different portions of the winding 78 from the main body 50. In the illustrated embodiment, the insulator 82 is positioned along a radially outward surface 114 of the slot 66 and the wire 86 is positioned along a radially inward surface 118 and a side surface 122 of the slot 66. The side surface 122 extend in a radial direction between the radially inward surface 118 and the radially outward surface 114. The combination of the insulator 82 and the wire 86 may be determined by manufacturing capabilities. For example, positioning wire 86 along the radially outward surface 114 of the slot 66 may require advanced fixtures to properly hold the wire 86 in place. Therefore, the combination of the insulator 82 positioned along the radially outward surface 114 with the wire 86 positioned along the radially inward surface 118 and side surface 122 is a cost-effective combination and arrangement that does not require advanced manufacturing fixtures. In other embodiments, any combination of the insulator 82 and the wire 86 may be provided and positioned within the slot 66. In some embodiments, the relative positioning of the insulator 82 and the wire 86 may be utilized to conduct heat from the winding 78 in a desired direction (i.e., the direction toward the wire 86) while preventing heat from conducting in an undesired direction (i.e., the direction toward the insulator 82).

Although in the illustrated embodiment the wire 86 is positioned within the stator 22, in other embodiments, the wire 86 may be positioned within the rotor 26 or other suitable portions of the electric motor 18 to provide electrical insulation and thermal conductivity. As mentioned above, the rotor 26 may include a winding positioned within a slot of a rotor main body 30. In some embodiments, the wire 86 is positioned between the winding and the rotor main body 30. In other words, the wire 86 may be included in either or both the stator 22 and the rotor 26.

Various features of the invention are set forth in the following claims.

What is claimed is:

1. A stator comprising:
    a main body with a slot defined therein;
    a winding positioned within the slot; and
    a wire positioned within the slot, the wire positioned between the winding and the main body.

2. The stator of claim 1, wherein the wire is electrically isolated from the winding.

3. The stator of claim 2, wherein the winding is electrically coupled to a power supply.

4. The stator of claim 1, wherein the winding is magnet wire having a first cross-sectional area, and wherein the wire is magnet wire having a second cross-sectional area smaller than the first cross-sectional area.

5. The stator of claim 1, wherein the wire includes an electrically conductive core and an insulative film.

6. The stator of claim 5, wherein the electrically conductive core directly contacts the main body.

7. The stator of claim 5, wherein the insulative film directly contacts the winding.

8. The stator of claim 1, wherein the main body is a stack of a plurality of stator laminations.

9. The stator of claim 1, further comprising an insulator positioned within the slot, the insulator positioned between the winding and the main body.

10. The stator of claim 9, wherein the insulator is formed from a plastic material.

11. The stator of claim 9, wherein
the slot includes a radially outward surface, a radially inward surface, and a side surface extending between the radially outward surface and the radially inward surface,
the wire includes an electrically conductive core and an insulative film,
the insulator is positioned between the winding and the radially outward surface, and
the wire is positioned between the winding and at least one of the radially inward surface and the side surface.

12. An electric motor comprising:
a stator; and
a rotor;
wherein at least one of the stator and the rotor includes
a main body that defines a slot;
a winding positioned within the slot; and
a wire positioned within the slot, the wire positioned between the winding and the main body.

13. The electric motor of claim 12, wherein the winding is electrically coupled to a power supply and wherein the wire is electrically isolated from the winding.

14. The electric motor of claim 12, wherein the winding is magnet wire having a first cross-sectional area, and wherein the wire is magnet wire having a second cross-sectional area smaller than the first cross-sectional area.

15. The electric motor of claim 12, wherein the wire includes an electrically conductive core and an insulative film.

16. The electric motor of claim 15, further comprising an insulator,
wherein the slot includes a radially outward surface, a radially inward surface, and a side surface extending between the radially outward surface and the radially inward surface,
the insulator is positioned between the winding and the radially outward surface, and
the wire is positioned between the winding and at least one of the radially inward surface and the side surface.

17. The electric motor of claim 12, wherein the electric motor is a brushless DC motor.

18. The electric motor of claim 17, wherein the stator includes the main body and the winding is a stator winding, and wherein the rotor includes a permanent magnet.

19. The electric motor of claim 12, wherein the main body is a stack of laminations.

20. A power tool comprising:
a housing;
an electric motor positioned within the housing, the electric motor including
a main body that defines a slot,
a winding positioned within the slot, and
a wire positioned within the slot, the wire positioned between the winding and the main body.

* * * * *